Figure 1:
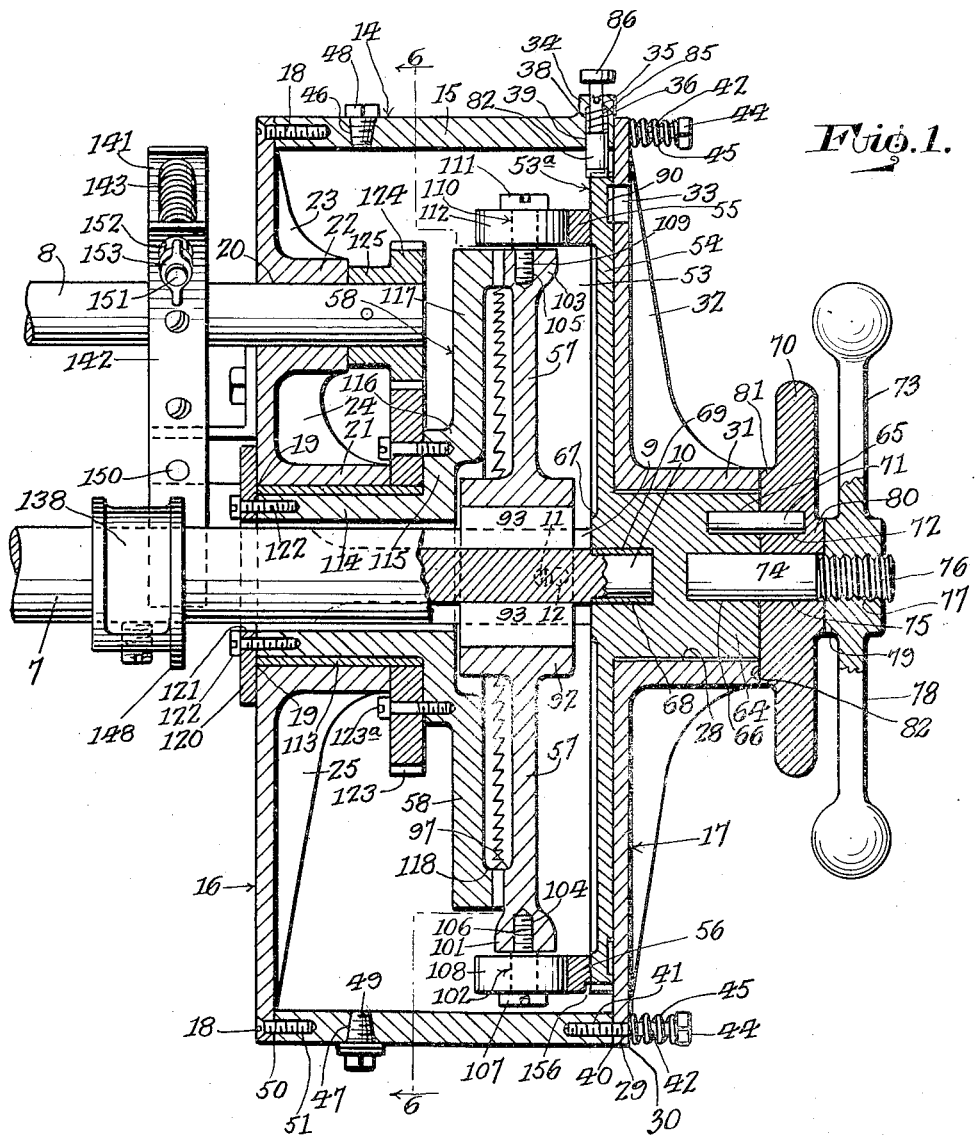

March 3, 1936.  J. M. MINKOW  2,032,710

COMBINED MEASURING GAUGE AND FEED CONTROLLING MECHANISM

Filed May 1, 1935  4 Sheets-Sheet 1

Inventor
Julius M. Minkow

By Geo. P. Kimmel
Attorney

March 3, 1936.  J. M. MINKOW  2,032,710

COMBINED MEASURING GAUGE AND FEED CONTROLLING MECHANISM

Filed May 1, 1935  4 Sheets-Sheet 2

Inventor
Julius M. Minkow
By Geo. P. Kimmel
Attorney

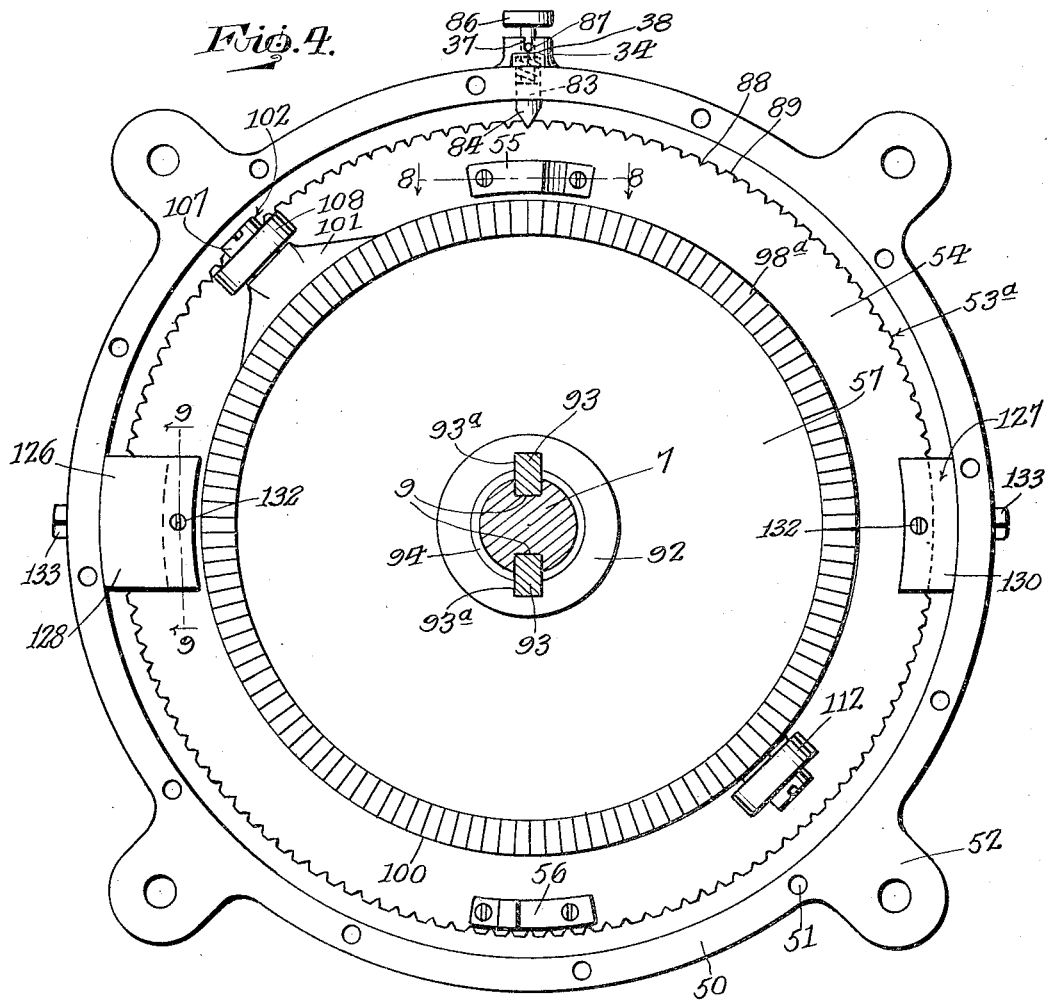
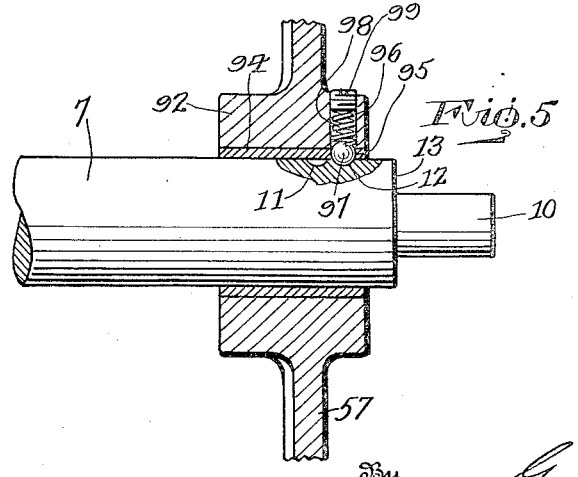

March 3, 1936. J. M. MINKOW 2,032,710
COMBINED MEASURING GAUGE AND FEED CONTROLLING MECHANISM
Filed May 1, 1935 4 Sheets-Sheet 4
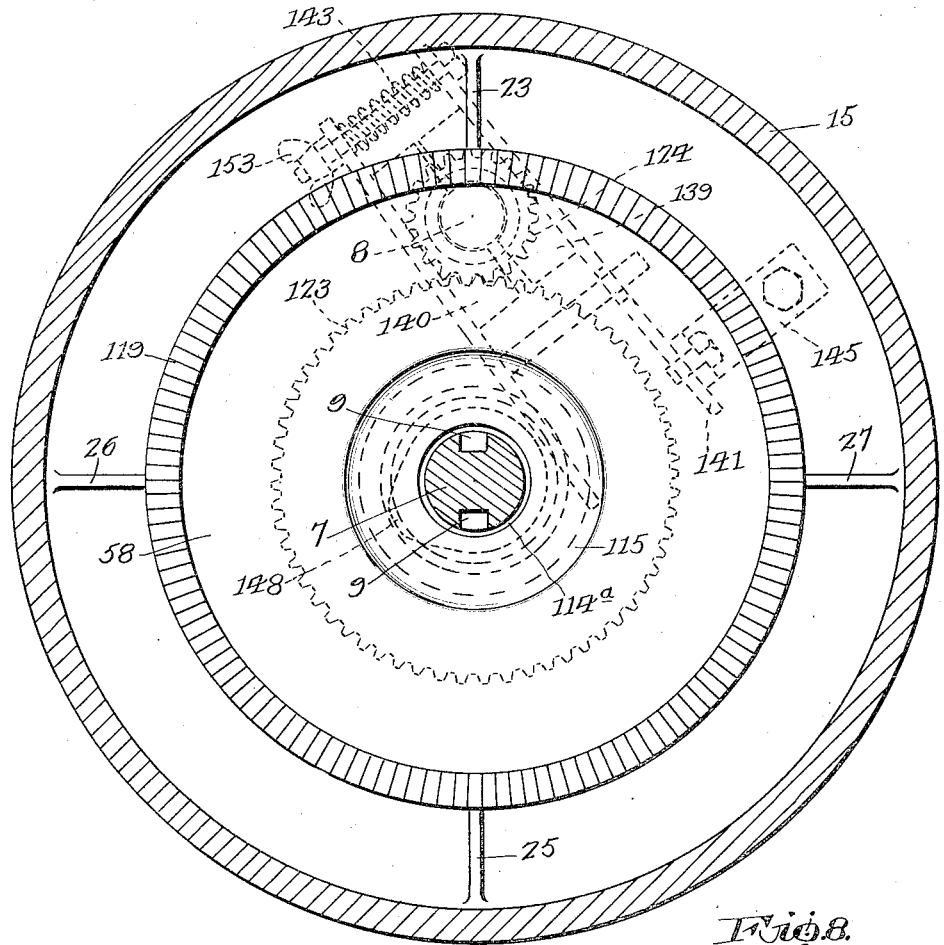
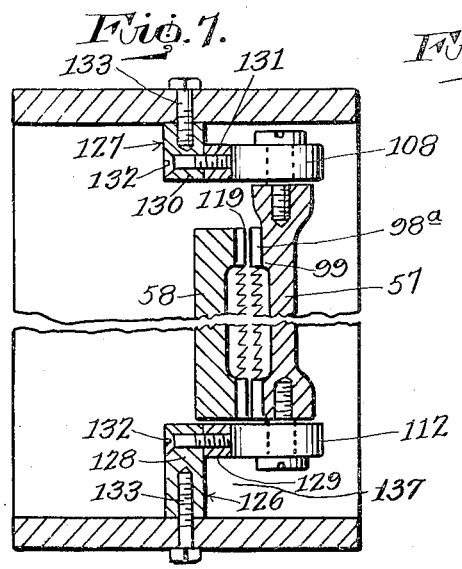
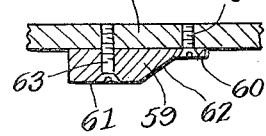
Inventor
Julius M. Minkow
By Geo. P. Kimmel
Attorney Patented Mar. 3, 1936

2,032,710

UNITED STATES PATENT OFFICE 2,032,710

COMBINED MEASURING GAUGE AND FEED CONTROLLING MECHANISM

Julius M. Minkow, New York, N. Y., assignor to Robert Minkow, New York, N. Y.

Application May 1, 1935, Serial No. 19,313

14 Claims. (Cl. 33—136)

This invention relates to a combined measuring gauge and feed controlling mechanism designed primarily for use in connection with paper cutting machines, but it is to be understood that a mechanism, in accordance with this invention, is also designed for use in any connection for which it may be found applicable.

The object of my invention is to provide, in a manner as hereinafter set forth, a mechanism of the class referred to for controlling the operation of a paper roll unwinding or feed shaft for the purpose of successively presenting like lengths of the paper web from off the roll to be severed by a knife or cutter, thereby resulting in sheets of uniform length.

A further object of the invention is to provide, in a manner as hereinafter set forth, a mechanism of the class referred to for use in connection with paper cutting machines, for automatically controlling the production of paper sheets of uniform length from a web unwinding from off a roll of paper.

A further object of the invention is to provide, in a manner as hereinafter set forth, an adjustable combined measuring gauge and feed controlling mechanism acting to produce from an unwinding paper web sheets of uniform selected length.

A further object of the invention is to provide, in a manner as hereinafter set forth, a combined measuring gauge and feed controlling mechanism for controlling the operation of a paper stock feed shaft to produce sheets of uniform length from the stock.

A further object of the invention is to provide, in a manner as hereinafter set forth, a combined measuring gauge and feed controlling mechanism for intermittently driving and holding a paper stock feed shaft from movement to control the extent of the feed thereby resulting in the production of sheets of uniform selected lengths.

Further objects of the invention are to provide, in a manner as hereinafter set forth, a combined measuring gauge and feed controlling mechanism which is comparatively simple in its construction and arrangement, strong, durable, compact, readily installed with respect to a cutting machine operating shaft and a paper stock feed shaft, accurate in its operation, thoroughly efficient in its use, automatic in action, readily repaired when occasion requires, and comparatively inexpensive to manufacture.

With the foregoing and other objects in view, the invention consists of such parts and such combination of parts, as are hereinafter more specifically described and illustrated in the accompanying drawings, wherein is shown an embodiment of the invention, but it is to be understood that changes, variations and modifications may be resorted to which fall within the scope of the invention as claimed.

Figure 2:
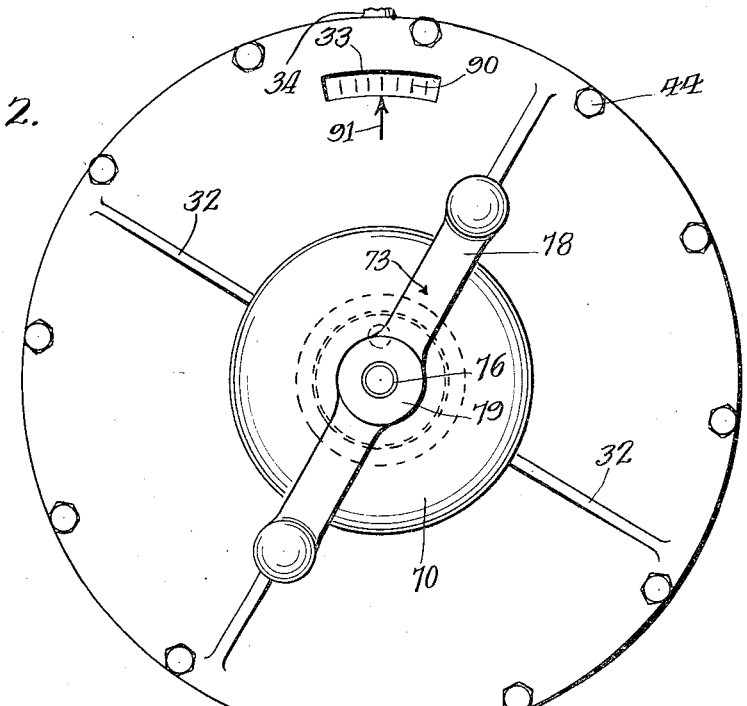
Figure 3:
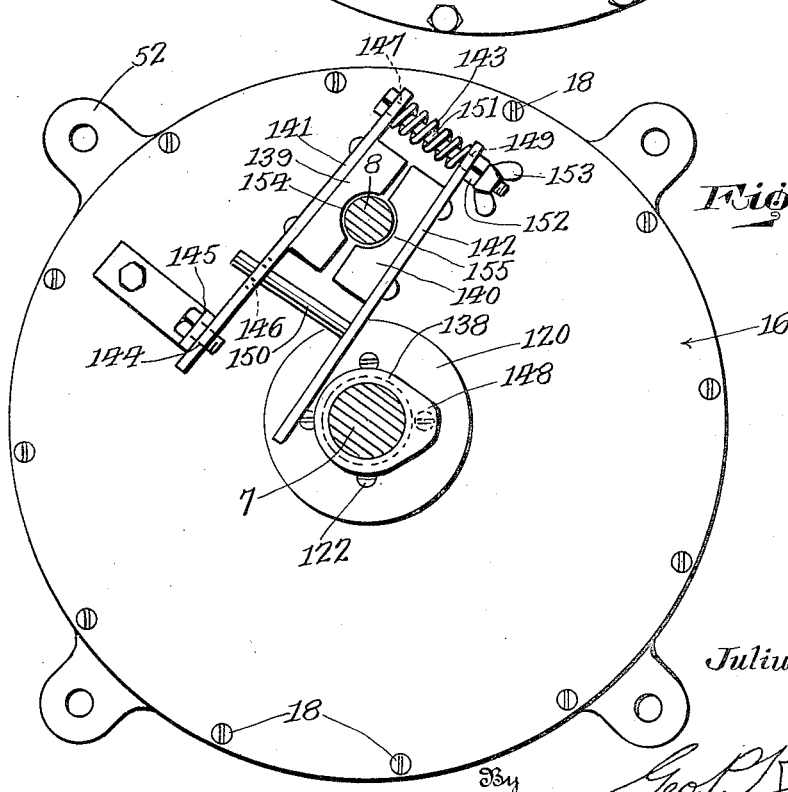

In the drawings wherein like reference characters denote corresponding parts throughout the several views:

Figure 1 is a longitudinal sectional view of the mechanism showing the installation thereof with the drive shaft of a paper cutting machine and a paper stock feed shaft, Figure 2 is an elevation looking towards the outer end of the mechanism, Figure 3 is an elevation looking towards the inner end of the mechanism, Figure 4 is an elevation looking into the housing towards its outer end and with the inner end of the housing removed, Figure 5 is a sectional detail illustrating the couplings between the mechanism and the drive shaft of a paper cutting machine, Figure 6 is a vertical sectional view of the mechanism on line 6—6, Figure 1, Figure 7 is a fragmentary vertical sectional view illustrating the cam blocks for shifting the driving gear of the mechanism from driving relation with respect to the driven gear, Figure 8 is a section on line 8—8, Figure 4, and Figure 9 is a section on line 9—9, Figure 4.

Referring to the drawings, 7 indicates the drive shaft of a paper cutting machine, not shown, and 8 a feed or unwinding shaft for a roll of paper, not shown. The paper is to be in the form of a continuous web. Stretches or lengths of the web are to be presented to the cutting mechanism or knife of the cutting machine to be severed to provide the paper of sheet like form. The shaft 7 (Figures 1 and 5) is formed with a pair of diametrically opposed key-ways 9 a reduced end terminal portion 10 and a pair of spaced parallel closely related cavities 11, 12 in its periphery for a purpose to be referred to. The cavities 11, 12 are arranged in close proximity to the inner end of the end terminal portion 10. The junction of the latter with the other portion of the shaft 7 provides a shoulder 13. The outer end of the key-ways 9 opens at the shoulder 13. The cavities 11, 12 are arranged midway between the key-ways.

A housing is designated 14 and includes a horizontally disposed annular body part 15 and inner and outer circular heads 16, 17 respectively. The head 16 is fixedly secured against the inner end edge of body portion 15 by the holdfast means 18. The head 16 is provided with an opening 19 at its axis and an opening 20 between opening 19 and its outer edge. The opening 19 is of greater diameter than opening 20. Formed integral with the inner face of head 16 are spaced superposed parallel bearing sleeves 21, 22 having their inner faces form flush continuations of the walls of the openings 19, 20 respectively. The sleeve 21 is of greater length than sleeve 22. Reinforcing webs 23, 24, 25, 26, and 27 are integral with the inner face of head 16. The web 23 merges at its inner end into the outer periphery of the sleeve 22. The web 24, at one end, merges into the outer periphery of sleeve 22 and at its other end merges into the outer periphery of sleeve 21. The webs 25, 26, and 27 merge at their inner ends into the outer periphery of sleeve 21. The webs 23, 24, and 25 are arranged in endwise alignment.

The head 17 is formed with an enlarged axially arranged opening 28 and a series of spaced non-threaded openings 29, only one shown, in proximity to its outer edge 30. Formed integral with the outer face of head 17 is an outwardly directed sleeve 31 having its inner face forming a flush continuation of the wall of opening 28. The outer face of head 17 is provided with reinforcing webs 32 which merge at their inner ends into the outer periphery of sleeve 31. The latter aligns with the bearing sleeve 21 on the head 16. The head 17, adjacent its outer edge, is cut out to form an arcuate slot 33 constituting a sight opening for a purpose to be referred to. The head 17 is coupled with the body portion 15 in a manner to be referred to.

The top of the body portion 15 is formed with an upstanding tubular lug 34 having its inner face upon two different diameters, as at 35, 36, and its top edge formed with a pair of diametrically opposed notches 37, only one shown. The portion of smallest inner diameter of lug 34 is at the upper part of the latter. The junction of the two diameters of the inner face of lug 34 forms the latter with an internal shoulder 38 providing an abutment for a purpose to be referred to. The top of body portion 15 is formed with an opening 39 having its inner face forming a flush continuation of the portion of largest inner diameter of lug 34. The latter is flush with the outer edge 40 of body portion 15. The purpose of lug 34 and opening 39 will be hereinafter referred to. The edge 40 is formed with a row of spaced threaded sockets 41, only one shown, into which engage threaded bolts 42 extending through non-threaded openings 29 for slidably connecting the head 17 to body portion 15. The bolts 42 extend outwardly from the head 17 and their heads are indicated at 44. Mounted on the bolts 42 and interposed between the bolt heads 44 and the outer face of head 17 are coiled springs 45 forming a resilient abutment for the head 17 on the outward sliding of the latter and normally tending to maintain head 17 against edge 40 of body portion 15. The latter is formed with spaced tapered oppositely disposed screw threaded openings 46, 47 closed by removable threaded plugs 48, 49 respectively. The opening 46 constitutes an intake for a lubricant and the opening 47 a drain. The inner end edge 50 of body portion 15 is formed with a row of threaded sockets 51 for the reception of the holdfast means 18. The body portion 15 at its inner end is provided with a series of outwardly extending, radially disposed apertured ears 52 for the passage of holdfast means, not shown, for anchoring the housing 14 to parts, not shown, of the cutting machine.

The body portion 15, in connection with the heads 16, 17, provide a chamber 53 in which is arranged a revolubly adjustable vertically disposed carrier 53ª including a circular disc 54 formed on its rear face with a pair of diametrically opposed oppositely extending arcuate cam members 55, 56 for shifting a driving gear 57 (Figure 1) into mesh with and for operating a driven gear 58. The members 55, 56 are of like form and each consists of an oblong block 59 (Figure 8) having its outer face provided with a flat part 60 inset with respect to and spaced from a flat part 61. The part 60 is connected to the part 61 by an inclined part 62 leading from part 60 at an outward inclination throughout. Each cam member is anchored in position by a pair of holdfast elements 63 countersunk therein, extending therethrough and engaging in disc 54.

Extending outwardly from and integral with the front face of disc 54, axially of the latter, is a trunnion 64 provided at its outer end portion with a pair of spaced sockets 65, 66. The socket 66 is arranged at and the socket 65 is disposed parallel to the axis of trunnion 64 and opens at the outer end of the latter. The rear face of disc 54, axially thereof, is formed with a laterally disposed circular enlargement 67. The disc 54 is formed with an axially disposed socket 68 opening at the rear face thereof and extending through the disc 54 into the trunnion 64. Arranged within the socket 68 is a bushing 69. Extending into and rotating in the bushing 69 is the reduced end terminal portion 10 of the drive shaft 7. The enlargement 67 of disc 54 opposes the shoulder 13 of shaft 7. The disc 54 is capable of being revolved in opposite directions about the end portion 10 of shaft 7 for a purpose to be referred to.

The trunnion 64 extends into the sleeve 31 of head 17 and its diameter is slightly less than the inner diameter of sleeve 31. The trunnion 64 is maintained in spaced relation with respect to the inner face of sleeve 31 by the shaft portion 10 coacting with the bushing 69 and wall of socket 68. There is associated with the trunnion 64 a handle or wheel 70 for manually revolving it to adjust carrier 53ª. The handle 70 is coupled to the outer end of the trunnion 64 by a pin 71 which is anchored in socket 65 and extends into a socket 72 formed in handle 70. The handle or wheel 70 is coupled by the pin 71 to the trunnion 64 to provide for their revolving in unison. There is associated with the trunnion 64 and handle 70 a releasable clamp structure 73 for clamping the carrier 53ª in its adjusted position. The structure 73 includes a pin 74 anchored in socket 66 and loosely extending through and projecting outwardly from an opening 75 in handle 70. The pin 74 has a threaded outer portion 76 which engages in a threaded opening 77 formed axially of a revoluble operating bar 78 functioning to move structure 73 to clamping position and to release it from such position. The bar 78 has a laterally extending circular enlarged portion 79 centrally thereof which coacts with a laterally enlarged circular portion 80 on the outer face of the handle 70.

The handle or wheel 70 has an enlarged circular portion 81 on its inner face which is to abut the outer end edge 82 of sleeve 31. The pin 74 and bar 78 of structure 73 act to tightly clamp the enlargements 79, 80, 81 and sleeve 31 together to maintain the disc 54 in frictional engagement with the inner face of head 17 to prevent the shifting of the carrier 53ª from adjusted position. The tightening of bar 78 on pin 74 provides for the foregoing action or locking of said parts. On releasing bar 78 the carrier 53ª may be manually adjusted by the handle 70 revolving trunnion 64.

There is also associated with the disc 54 a latching means to retain the carrier 53ª in adjusted portion before it is clamped or locked in a manner as aforesaid. The latching means includes a vertically movable spring controlled plunger or latching member 82 which is slidably mounted in lug 34 and extends through opening 39 into chamber 53. The plunger 82 has a peripheral shoulder 83 and a V-shaped inner end 84. Surrounding the plunger 82 and interposed between the shoulders 38 and 83 is the plunger controlling spring 85. The outer end of plunger 82 has a head 86 and adjacent to the latter a diametrically extending pin 87 for seating in the notches 37 to prevent the revolving of the plunger relative to lug 34. The spring 84 normally acts to maintain the inner end of the plunger in a notch of a row of spaced parallel notches 88 disposed transversely of and throughout the outer edge 89 of disc 54. The front face of the latter is formed with an annular regulating scale 90 which is visible through the slot 33 to ascertain the necessary adjustment of the carrier 53ª to obtain the desired length that stretches of the stock should be severed to produce the sheets of paper. The outer face of head 17 has a pointer 91 which associates with scale 90.

The drive shaft 7 for the cutting machine extends through the opening 19 in head 16 to the extent that the end portion 10 thereof is arranged in the bushing 69. The driving gear 57 is of the crown type and includes a hub 92 which is slidably mounted on shaft 7 adjacent the end portion 10 of the latter. Keys 93 (Figure 4) are secured in the grooves 9 and extend into diametrically opposed grooves 93ª formed in the inner face of the hub 92 of gear 57 to provide for the gear 57 to bodily rotate with shaft 7, as well as for slidably connecting the gear upon said shaft. Interposed between the shaft 7 and the hub 92, as well as being secured to the latter, is a sectional bushing 94. Between the sections of the bushing 94 extend the keys 93. One of the sections of the bushing 94 (Figure 5) is formed with an opening 95 adapted to selectively register with the cavities 11, 12. The hub 92, adjacent to one end thereof, is formed with a vertically disposed opening 96 which permanently registers at its inner end with opening 95. Arranged in the latter and extending into opening 96 is a globular latching member 97. Within the opening 96 is a controlling spring 98 for the latching member 97. The outer end of opening 96 is closed by a removable plug 99. The spring 98 is interposed between the member 97 and plug 99 and normally acts to extend member 97 beyond the inner face of bushing 94. The member 97 is to selectively engage in cavities 11, 12 to arrest the sliding movement of gear 57 upon shaft 7. When member 97 engages in cavity 11 it holds gear 57 in driving relation for gear 58. When member 97 engages in cavity 12 it holds gear 57 out of driving relation with respect to gear 58. The normal position of gear 57 (Figure 5) is in non-driving relation with respect to gear 58, which position is had by the engagement of member 97 in cavity 12. The gear 57 is shifted from non-driving to driving relation with respect to gear 58 by the cam members 55, 56, and when shifted to driving position it is latched by the engagement of member 97 in cavity 11. The gear 57 is shifted from driving position by a means to be hereinafter referred to. The teeth of gear 57 are designated 98ª and are formed in an annular offset 99 (Figure 7) extending throughout the outer marginal portion of the rear face of the gear 57 and flush with the outer edge 100 of the latter. The gear 57 has extended from its outer edge 100 a radially disposed flared arm 101 (Figures 1 and 4) having at its outer end a stub shaft 102. The gear 57 is formed on its front face with a lateral offset 103 (Figure 1) which is flush with edge 100. The arm 101 is formed with a threaded socket 104. The gear 57 has a threaded socket 105 opening at edge 100. The sockets 104, 105 (Figure 1) are diametrically opposed. The stub shaft 102 has a reduced threaded inner portion 106, which engages in socket 104, and a head 107 at its outer end. Mounted on shaft 102 is a roller 108. Threadedly engaging with the wall of socket 105 is the reduced threaded end 109 of a stub shaft 110 provided with a head 111 at its outer end. Mounted on shaft 110 is a roller 112. The rollers 108, 112 ride up and off the cam members 55, 56 during the rotation of the gear 57 for shifting the latter from non-driving to driving relation with respect to gear 58. The heads 107, 111 retain the rollers 108, 112 on the shafts 102, 110.

With reference to Figure 1. Mounted in the sleeve 21 is a bushing 113 which surrounds the hub 114 of the driven gear 58. The hub is spaced from shaft 7, as at 114ª. The front end of hub 114 is formed with an annular flange 115 which has the outer marginal portion of its front face integral with the rearwardly directed annular flange 116 formed at the inner end of the web or body 117 of gear 58. The latter is of the crown type and is oppositely disposed with respect to gear 57. The outer marginal portion of the front face of web 117 is formed with an annular enlargement 118 provided throughout with transversely extending teeth 119 constituting the teeth of gear 58 and which oppose the teeth of gear 57. Positioned against the rear face of head 16 is retainer plate 120 formed with a large opening 121 through which the shaft 7 extends. The plate 120 abuts against the rear end edge and has the wall of its opening 121 flush with the inner face of hub 114. Extending through plate 120 and engaging in the hub 114 are holdfast means 122 for coupling the plate and hub together to arrest the shifting of gear 58 towards gear 57. The hub 114 is of greater length than sleeve 21 and extends beyond the front end of the latter. The bushing 113 extends from plate 120 to and abuts the rear face of flange 115. Surrounding the bushing 113 and interposed between the front end of sleeve 21 and the rear face of flange 115 is a power transmitting gear wheel 123. The latter is anchored to flange 115 by the holdfast means 123ª to provide for gear 123 bodily moving with gear 58. The sleeve 21, flange 115 and gear 123 coact to prevent the gear 58 from shifting rearwardly from gear 57. The sleeve 21, hub 114, flange 115, plate 120 and gear 123 coact to retain gear 58 permanently at one point in chamber 53 in opposed relation with respect to gear 57.

Extending through sleeve 22 and into chamber 53 is the feed or roll unwinding shaft 8 having fixed to its front end a pinion 124 which permanently meshes with and is operated from gear wheel 123. The pinion 124 has a rearwardly extending hub 125 which abuts sleeve 22.

Secured to the inner face of body portion 15 of housing 14 at diametrically opposed points are oppositely disposed cam blocks 126, 127 for co-acting with the rollers 112, 108 respectively for shifting gear 57 from driving relation with respect to gear 58. The blocks 126, 127 are of angle-shape in cross section to provide each with legs (Figure 7) disposed diametrically and lengthwise of body portion 15. The legs of block 126 are designated 128, 129. The legs of block 127 are designated 130, 131. The legs 128, 130 extend diametrically and the legs 129, 131 extend lengthwise of body portion 15. The leg 128 is of greater length than leg 130. The legs 129, 131 are of the same length, extend from the forward sides of and are flush with the outer ends of the legs 128, 130 respectively. The legs are of the same width. The outer end edges of the blocks 126, 127 are of arcuate contour. The legs of each pair are anchored together by the holdfast means 132. The blocks 126, 127 are anchored against the inner face of body portion 15 by the holdfast means 133. The lower face of the legs 129, 131 (Figure 9) is formed with a high part 134, a low part 135 and an inclined part 136 leading at an upward inclination from the inner end of part 135 to the inner end of part 134. The leg 129, in connection with the body portion 15, forms a vertically disposed clearance or passage 137 (Figure 7) for the roller 108. The high, low and inclined parts 134 of the block 126 are oppositely disposed with respect to the high, low and inclined parts of the block 127. The high and inclined parts of block 126 are arranged in the path of the roller 112. The high and inclined parts of the block 127 are arranged in the path of roller 108. The said high and inclined parts of the blocks function, in connection with the rollers 108, 112, for shifting gear 57 from intermeshing or driving engagement with the gear 58.

Fixedly secured on shaft 7 rearwardly of head 16 is a cam 138 functioning to operate a brake mechanism for intermittently applying a braking action on shaft 8 to arrest it from movement. The said mechanism consists of a pair of oppositely disposed simultaneously operated brake shoes 139, 140 fixed on the opposed faces of a pair of spring controlled holder bars 141, 142 respectively capable of shifting towards each other against the action of the controlling spring 143 therefor. The bar 141 is anchored at its lower end, as at 144, to a bracket 145 fixedly secured to the head 16. The bar 141 intermediate its ends is formed with an opening 146 and at its upper end with an opening 147. The lower portion of the bar 142 is arranged in the path of the lobe 148 of the cam 138. The bar 142, at its upper end, is formed with an opening 149 and between its transverse median and its lower end has rigidly secured thereto a laterally disposed pin 150 which slidably extends through opening 146 whereby the lower portion of bar 142 is supported from bar 141. Extending through the openings 149, 147 and spring 143 is a combined support and tensioning element for said spring consisting of a headed threaded bolt 151, a securing nut 152 and a clamping nut 153 of the wing type. The spring 143 is arranged on the shank of the bolt 151 between the bars 141, 142. The head of the bolt abuts the outer side of bar 141. The nut 152 is to abut the outer side of bar 142. The nut 153 is to abut nut 152. The shoes 139, 140 have their inner faces formed with oppositely disposed semi-circular grooves 154, 155 respectively opposing opposite portions of the periphery of shaft 8. The walls of the grooves are for bending against shaft 8 to arrest the movement thereof. When the lobe 148 of cam 138 engages the outer side of bar 142 the latter is shifted towards bar 141 whereby the brake shoes apply a braking action to shaft 8 and arrest it from movement. The mechanism is automatically released from shaft 8 when lobe 148 clears bar 142.

The cam member 55 is positioned a greater distance from the edge 89 of disc 54 than the distance between said edge and cam member 56 due to the fact that roller 108 is arranged in closer relation to the edge of cam 57 than that of roller 112. The cam member 56 is cut out, as at 156 (Figure 1) to provide a clearance for the inner end of plunger 82 on the adjusting of disc 54.

The cam members 55, 56 are shifted relative to the cam blocks 126, 127 selectively in opposite directions for varying the duration of the operation of gear 58 from gear 57 for controlling the length of the sheet to be cut. The nearer the cam members 55, 56 are adjusted towards the blocks 126, 127 respectively, the shorter the length of the sheet cut from the web will be. The further the cam members 55, 56 are adjusted from the blocks 126, 127 respectively, the longer the length of the sheet cut from the web will be.

The lobe 148 applies the pressure on the brake only at the moment when gear 57 is disengaged from gear 58, thereby stopping shaft 8 when the feed is discontinued. The extent of the shifting of gear 57 to and from driving and non-driving relation is respectively the distance from cavity 12 to cavity 11 and from cavity 11 to cavity 12.

On the operation of shaft 7 the gear 57 will be carried therewith, and as the gear rotates rollers 108, 112 will be brought to travel simultaneously lengthwise of cam members 56, 55 respectively resulting in the shifting of gear 57 in a direction on shaft 7 to an extent to mesh with and drive gear 58, which in turn will drive gear wheel 123, and the latter in turn will rotate pinion 124 to provide for the operation of shaft 8 to cause the web to unwind from the roll of paper stock. As gear 57 continues to rotate, the rollers 108, 112 clear the blocks 126, 127 respectively. A further travel of the gear 57 provides for the rollers 108, 112 travelling against blocks 127, 126 respectively resulting in the gear 57 being moved from driving relation with respect to gear 58. On the start of the shifting of the gear 57 from driving relation relative to gear 58 the shaft 7 has carried the cam 138 therewith to a position whereby the lobe 148 will contact with bar 142 and operate the braking mechanism whereby the shaft 8 is arrested from movement.

The adjustability of the carrier 53ª provides for the positioning of the cam members 55, 56 selective distances apart with respect to the blocks 126, 127 respectively. The adjustment may be determined by the scale 33 on disc 54 which is visible through slot 33.

What I claim is:

1. In a mechanism for controlling the operation of a paper web feed shaft of paper cutting machines, an operating shaft, a driven gear, an operative driving connection leading therefrom to and for the feed shaft, a rotatable driving gear, operated from and slidably mounted on said operating shaft and normally opposing in spaced relation the driven gear, a pair of spaced diametrically opposed rollers extended from the outer edge of and carried by said driving gear, a pair of diametrically opposed cam members arranged in the path of and coacting with said rollers for shifting the driving gear to driving relation with respect to said driven gear, a pair of spaced diametrically opposed cam blocks spaced from said cam members and one arranged in the path of one of said rollers and the other in the path of the other of the said rollers and coacting with the rollers for shifting the driving gear from driving relation with respect to the driving shaft, and means for holding the feed shaft from movement on the shift of said driving gear from and to driving relation with respect to said driven gear.

2. In a mechanism for controlling the operation of a paper web feed shaft of paper cutting machines, an operating shaft, a driven gear, an operative driving connection leading therefrom to and for the feed shaft, a rotatable driving gear, operated from and slidably mounted on said operating shaft and normally opposing in spaced relation the driven gear, a pair of spaced diametrically opposed rollers extended from the outer edge of and carried by said driving gear, a pair of diametrically opposed cam members arranged in the path of and coacting with said rollers for shifting the driving gear to driving relation with respect to said driven gear, a pair of spaced diametrically opposed cam blocks spaced from said cam members and one arranged in the path of one of said rollers and the other in the path of the other of the said rollers and coacting with the rollers for shifting the driving gear from driving relation with respect to the driving shaft, and means for holding the feed shaft from movement on the shift of said driving gear from and to driving relation with respect to said driven gear, the said means being spring controlled and including a suspended actuatable braking part for surrounding the feed shaft and an operating part carried by the operating shaft for intermittently actuating and holding said braking part in braking position.

3. In a mechanism for controlling the operation of a paper web feed shaft of paper cutting machines, an operating shaft, a driven gear, an operative driving connection leading therefrom to and for the feed shaft, a rotatable driving gear, operated from and slidably mounted on said operating shaft and normally opposing in spaced relation the driven gear, a pair of spaced diametrically opposed rollers extending from the outer edge of and carried by said driving gear, a pair of diametrically opposed cam members arranged in the path of and coacting with said rollers for shifting the driving gear to driving relation with respect to said driven gear, a pair of spaced diametrically opposed cam blocks spaced from said cam members and one arranged in the path of one of said rollers and the other in the path of the other of the said rollers and coacting with the rollers for shifting the driving gear from driving relation with respect to the driving shaft, means for holding the feed shaft from movement on the shift of said driving gear from and to driving relation with respect to said driven gear, and said driving gear and operating shaft having coacting parts for latching said driving gear in driving and non-driving position.

4. In a mechanism for controlling the operation of a paper web feed shaft of paper cutting machines, an operating shaft, a driven gear, an operative driving connection leading therefrom to and for the feed shaft, a rotatable driving gear, operated from and slidably mounted on said operating shaft and normally opposing in spaced relation the driven gear, a pair of spaced diametrically opposed rollers extended from the outer edge of and carried by said driving gear, a pair of diametrically opposed cam members arranged in the path of and coacting with said rollers for shifting the driving gear to driving relation with respect to said driven gear, a pair of spaced diametrically opposed cam blocks spaced from said cam members and one arranged in the path of one of said rollers and the other in the path of the other of the said rollers and coacting with the rollers for shifting the driving gear from driving relation with respect to the driving shaft, means for holding the feed shaft from movement on the shift of said driving gear from and to driving relation with respect to said driven gear, and a revoluble carrier for shifting the cam members towards and from said cam blocks for selectively varying the extent of the drive of the driving gear on the driven gear thereby controlling the feed of the web from the feed shaft.

5. In a mechanism for controlling the operation of a paper web feed shaft of paper cutting machines, an operating shaft, a driven gear, an operative driving connection leading therefrom to and for the feed shaft, a rotatable driving gear, operated from and slidably mounted on said operating shaft and normally opposing in spaced relation the driven gear, a pair of spaced diametrically opposed rollers extended from the outer edge of and carried by said driving gear, a pair of diametrically opposed cam members arranged in the path of and coacting with said rollers for shifting the driving gear to driving relation with respect to said driven gear, a pair of spaced diametrically opposed cam blocks spaced from said cam members and one arranged in the path of one of said rollers and the other in the path of the other of the said rollers and coacting with the rollers for shifting the driving gear from driving relation with respect to the driving shaft, means for holding the feed shaft from movement on the shift of said driving gear from and to driving relation with respect to said driven gear, a revoluble carrier for shifting the cam members towards and from said cam blocks for selectively varying the extent of the drive of the driving gear on the driven gear thereby controlling the feed of the web from the feed shaft, means for latching said carrier in adjusted position, and means for clamping said carrier in its adjusted position.

6. In a mechanism for controlling the operation of a paper web feed shaft of paper cutting machines, an operating shaft, a driven gear, an operative driving connection leading therefrom to and for the feed shaft, a rotatable driving gear, operated from and slidably mounted on said operating shaft and normally opposing in spaced relation the driven gear, a pair of spaced diametrically opposed rollers extended from the outer edge of and carried by said driving gear, a pair of diametrically opposed cam members arranged in the path of and coacting with said rollers for shifting the driving gear to driving relation with respect to said driven gear, a pair of spaced diametrically opposed cam blocks spaced from said cam members and one arranged in the path of one of said rollers and the other in the path of the other of the said rollers and coacting with the rollers for shifting the driving gear from driving relation with respect to the driving shaft, means for holding the feed shaft from movement on the shift of said driving gear from and to driving relation with respect to said driven gear, a revoluble carrier for shifting the cam members towards and from said cam blocks for selectively varying the extent of the drive of the driving gear on the driven gear thereby controlling the feed of the web from the feed shaft, means for latching said carrier in adjusted position, means for clamping said carrier in its adjusted position, and a housing enclosing said gears, members and operative drive connection and having means at one end for the passage of said shafts therein.

7. In a mechanism for controlling the operation of a paper web feed shaft of paper cutting machines, an operating shaft, a driven gear, an operative driving connection leading therefrom to and for the feed shaft, a rotatable driving gear, operated from and slidably mounted on said operating shaft and normally opposing in spaced relation the driven gear, a pair of spaced diametrically opposed rollers extended from the outer edge of and carried by said driving gear, a pair of diametrically opposed cam members arranged in the path of and coacting with said rollers for shifting the driving gear to driving relation with respect to said driven gear, a pair of spaced diametrically opposed cam blocks spaced from said cam members and one arranged in the path of one of said rollers and the other in the path of the other of the said rollers and coacting with the rollers for shifting the driving gear from driving relation with respect to the driving shaft, means for holding the feed shaft from movement on the shift of said driving gear from and to driving relation with respect to said driven gear, a revoluble carrier for shifting the cam members towards and from said cam blocks for selectively varying the extent of the drive of the driving gear on the driven gear thereby controlling the feed of the web from the feed shaft, means for latching said carrier in adjusted position, means for clamping said carrier in its adjusted position, a housing enclosing said gears, members and operative drive connection and having means at one end for the passage of said shafts therein, said carrier being provided with a regulating scale, and said housing having a sight opening at its other end for viewing said scale.

8. In a mechanism for controlling the operation of a paper web feed shaft of paper cutting machines, an operating shaft, a driven gear, an operative driving connection leading therefrom to and for the feed shaft, a rotatable driving gear operated from and slidably mounted on said operating shaft and normally opposing in spaced relation the driven gear, a pair of spaced diametrically opposed rollers extended from the outer edge of and carried by said driving gear, a pair of diametrically opposed cam members arranged in the path of and coacting with said rollers for shifting the driving gear to driving relation with respect to said driven gear, a pair of spaced diametrically opposed cam blocks spaced from said cam members and one arranged in the path of one of said rollers and the other in the path of the other of the said rollers and coacting with the rollers for shifting the driving gear from driving relation with respect to the driving shaft, means for holding the feed shaft from movement on the shift of said driving gear from and to driving relation with respect to said driven gear, the said means being spring controlled and including a suspended actuatable braking part for surrounding the feed shaft and an operating part carried by the operating shaft for intermittently actuating and holding said braking part in braking position, and said driving gear and operating shaft having coacting parts for latching said driving gear in driving and non-driving position.

9. In a mechanism for controlling the operation of a paper web feed shaft of paper cutting machines, an operating shaft, a driven gear, an operative driving connection leading therefrom to and for the feed shaft, a rotatable driving gear, operated from and slidably mounted on said operating shaft and normally opposing in spaced relation the driven gear, a pair of spaced diametrically opposed rollers extended from the outer edge of and carried by said driving gear, a pair of diametrically opposed cam members arranged in the path of and coacting with said rollers for shifting the driving gear to driving relation with respect to said driven gear, a pair of spaced diametrically opposed cam blocks spaced from said cam members and one arranged in the path of one of said rollers and the other in the path of the other of the said rollers and coacting with the rollers for shifting the driving gear from driving relation with respect to the driving shaft, means for holding the feed shaft from movement on the shift of said driving gear from and to driving relation with respect to said driven gear, the said means being spring controlled and including a suspended actuatable braking part for surrounding the feed shaft and an operating part carried by the operating shaft for intermittently actuating and holding said braking part in braking position, and a revoluble carrier for shifting the cam members towards and from said cam blocks for selectively varying the extent of the drive of the driving gear on the driven gear thereby controlling the feed of the web from the feed shaft.

10. In a mechanism for controlling the operation of a paper web feed shaft of paper cutting machines, an operating shaft, a driven gear, an operative driving connection leading therefrom, to and for the feed shaft, a rotatable driving gear, operated from and slidably mounted on said operating shaft and normally opposing in spaced relation the driven gear, a pair of spaced diametrically opposed rollers extending from the outer edge of and carried by said driving gear, a pair of diametrically opposed cam members arranged in the path of and coacting with said rollers for shifting the driving gear to driving relation with respect to said driven gear, a pair of spaced diametrically opposed cam blocks spaced from said cam members and one arranged in the path of one of said rollers and the other in the path of the other of the said rollers and coacting with the rollers for shifting the driving gear from driving relation with respect to the driving shaft, means for holding the feed shaft from movement on the shift of said driving gear from and to driving relation with respect to said driven gear, said driving gear and operating shaft having coacting parts for latching said driving gear in driving and non-driving position, and a revoluble carrier for shifting the cam members towards and from said cam blocks for selectively varying the extent of the drive of the driving gear on the driven gear thereby controlling the feed of the web from the feed shaft.

11. In a mechanism for controlling the operation of a paper web feed shaft of paper cutting machines, an operating shaft, a driven gear, an operative driving connection leading therefrom, to and for the feed shaft, a rotatable driving gear, operated from and slidably mounted on said operating shaft and normally opposing in spaced relation the driven gear, a pair of spaced diametrically opposed rollers extending from the outer edge of and carried by said driving gear, a pair of diametrically opposed cam members arranged in the path of and coacting with said rollers for shifting the driving gear to driving relation with respect to said driven gear, a pair of spaced diametrically opposed cam blocks spaced from said cam members and one arranged in the path of one of said rollers and the other in the path of the other of the said rollers and coacting with the rollers for shifting the driving gear from driving relation with respect to the driving shaft, means for holding the feed shaft from movement on the shift of said driving gear from and to driving relation with respect to said driven gear, said driving gear and operating shaft having coacting parts for latching said driving gear in driving and non-driving position, means for latching said carrier in adjusted position, and means for clamping said carrier in its adjusted position.

12. In a mechanism for controlling the operation of a paper web feed shaft of paper cutting machines, an operating shaft, a driven gear, an operative driving connection leading therefrom to and for the feed shaft, a rotatable driving gear operated from and slidably mounted on said operating shaft and normally opposing in spaced relation the driven gear, a pair of spaced diametrically opposed rollers extended from the outer edge of and carried by said driving gear, a pair of diametrically opposed cam members arranged in the path of and coacting with said rollers for shifting the driving gear to driving relation with respect to said driven gear, a pair of spaced diametrically opposed cam blocks spaced from said cam members and one arranged in the path of one of said rollers and the other in the path of the other of the said rollers and coacting with the rollers for shifting the driving gear from driving relation with respect to the driving shaft, means for holding the feed shaft from movement on the shift of said driving gear from and to driving relation with respect to said driven gear, the said means being spring controlled and including a suspended actuatable braking part for surrounding the feed shaft and an operating part carried by the operating shaft for intermittently actuating and holding said braking part in braking position.

13. In a mechanism for controlling the operation of a paper web feed shaft of paper cutting machines, an operating shaft, a driven gear, an operative driving connection leading therefrom to and for the feed shaft, a rotatable driving gear, operated from and slidably mounted on said operating shaft and normally opposing in spaced relation the driven gear, a pair of spaced diametrically opposed rollers extended from the outer edge of and carried by said driving gear, a pair of diametrically opposed cam members arranged in the path of and coacting with said rollers for shifting the driving gear to driving relation with respect to said driven gear, a pair of spaced diametrically opposed cam blocks spaced from said cam members and one arranged in the path of one of said rollers and the other in the path of the other of the said rollers and coacting with the rollers for shifting the driving gear from driving relation with respect to the driving shaft, and means for holding the feed shaft from movement on the shift of said driving gear from and to driving relation with respect to said driven gear, a housing supporting said blocks therein and enclosing said gears and drive connection, said housing having means at one end for the passage of said shafts therein, said braking means being carried by the said end of the housing and said operating shaft.

14. In a mechanism for controlling the operation of a paper web feed shaft of paper cutting machines, an operating shaft, a driven gear, an operative driving connection leading therefrom to and for the feed shaft, a rotatable driving gear, operated from and slidably mounted on said operating shaft and normally opposing in spaced relation the driven gear, a pair of spaced diametrically opposed rollers extended from the outer edge of and carried by said driving gear, a pair of diametrically opposed cam members arranged in the path of and coacting with said rollers for shifting the driving gear to driving relation with respect to said driven gear, a pair of spaced diametrically opposed cam blocks spaced from said cam members and one arranged in the path of one of said rollers and the other in the path of the other of the said rollers and coacting with the rollers for shifting the driving gear from driving relation with respect to the driving shaft, means for holding the feed shaft from movement on the shift of said driving gear from and to driving relation with respect to said driven gear, a revoluble carrier for shifting the cam members towards and from said cam blocks for selectively varying the extent of the drive of the driving gear on the driven gear thereby controlling the feed of the web from the feed shaft, a housing supporting therein said carrier, blocks and drive connection and enclosing said gears, said housing having means at one end for the passage therein of said shafts, and said braking means having an actuatable braking part suspended from said end of the housing and surrounding the feed shaft and operating part carried by said operating part for said actuable part.

JULIUS M. MINKOW.